(12) United States Patent
Davis

(10) Patent No.: US 9,673,888 B2
(45) Date of Patent: Jun. 6, 2017

(54) ACQUIRING LEO SATELLITES WITHOUT COMPASS

(71) Applicant: QUALCOMM Incorporated, San Diego, CA (US)

(72) Inventor: Roy Howard Davis, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/862,647

(22) Filed: Sep. 23, 2015

(65) Prior Publication Data
US 2017/0085314 A1 Mar. 23, 2017

(51) Int. Cl.
H04B 7/185 (2006.01)
G01S 19/42 (2010.01)
G01S 19/02 (2010.01)

(52) U.S. Cl.
CPC .......... H04B 7/18513 (2013.01); G01S 19/02 (2013.01); G01S 19/42 (2013.01)

(58) Field of Classification Search
None
See application file for complete search history.

(56) References Cited

U.S. PATENT DOCUMENTS

| 6,226,494 | B1 | 5/2001 | Lundstrom et al. | |
|---|---|---|---|---|
| 6,373,432 | B1 | 4/2002 | Rabinowitz et al. | |
| 2002/0050953 | A1* | 5/2002 | Fang | G01S 3/20 343/703 |
| 2003/0048229 | A1 | 3/2003 | Schmid et al. | |
| 2009/0284411 | A1* | 11/2009 | Tessier | H04B 7/18554 342/357.48 |
| 2010/0090889 | A1 | 4/2010 | Hwang et al. | |
| 2010/0232351 | A1* | 9/2010 | Chansarkar | G01S 19/13 370/320 |
| 2014/0354477 | A1 | 12/2014 | Robinson | |
| 2016/0036117 | A1* | 2/2016 | Whitley | H01Q 3/005 250/395 |
| 2017/0041830 | A1* | 2/2017 | Davis | H04W 36/0005 |

FOREIGN PATENT DOCUMENTS

| EP | 0774843 A2 | 5/1997 |
|---|---|---|
| EP | 0910001 A2 | 4/1999 |
| EP | 0963061 A2 | 12/1999 |

OTHER PUBLICATIONS

International Search Report and Written Opinion—PCT/US2016/051132—ISA/EPO—Nov. 28, 2016.

* cited by examiner

Primary Examiner — Kouroush Mohebbi
(74) Attorney, Agent, or Firm — Paradice and Li LLP

(57) ABSTRACT

A method and apparatus for establishing a communication link between a user terminal and a first satellite associated with a first satellite service are disclosed. The user terminal determines a position of the user terminal based, at least in part, on location information provided by a satellite positioning system (SPS) receiver associated with the user terminal, determines a reference azimuth of the user terminal based, at least in part, on a position of a second satellite associated with a second satellite service that is different than the first satellite service, obtains ephemeris data for the first satellite, and aligns a directional antenna of the user terminal with the first satellite based, at least in part, on the position of the user terminal, the reference azimuth of the user terminal, and the received ephemeris data.

30 Claims, 15 Drawing Sheets

ACQUIRING LEO SATELLITES WITHOUT COMPASS

INTRODUCTION

Various aspects described herein relate to satellite communications, and more particularly to improving the reception of weak signals transmitted from ground-based devices.

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

A user terminal (UT) may use a high-gain and highly directional antenna to receive signals from NGSO satellites such as LEO satellites. Installing and aligning a highly directional antenna to establish a communication link with an NGSO satellite may be difficult for untrained users (e.g., consumers or homeowners), for example, due to the lack of a reference azimuth, the orbital speed of the NGSO satellite, and/or the relatively narrow beam widths associated with high-gain and highly directional antennas (e.g., as compared with the relatively wide beam widths associated with omnidirectional antennas).

SUMMARY

Aspects of the disclosure are directed to apparatuses and methods for establishing a communication link between a user terminal and one or more satellites that may form a constellation of satellites. In one example, a method for establishing a communication link between a user terminal and a first satellite associated with a first satellite service is disclosed. The method may include determining a position of the user terminal on Earth based, at least in part, on location information provided by a satellite positioning system (SPS) receiver associated with the user terminal. The method may also include determining a reference azimuth of the user terminal based, at least in part, on a position of a second satellite associated with a second satellite service that is different than the first satellite service. The method may also include obtaining ephemeris data for the first satellite, and then aligning a directional antenna of the user terminal with the first satellite based, at least in part, on the position of the user terminal, the reference azimuth of the user terminal, and the obtained ephemeris data.

In another example, a user terminal for establishing a communication link with a first satellite associated with a first satellite service is disclosed. The user terminal may include means for determining a position of the user terminal on Earth based, at least in part, on location information provided by a satellite positioning system (SPS) receiver associated with the user terminal. The user terminal may also include means for determining a reference azimuth of the user terminal based, at least in part, on a position of a second satellite associated with a second satellite service that is different than the first satellite service. The user terminal may also include means for obtaining ephemeris data for the first satellite, and means for aligning a directional antenna of the user terminal with the first satellite based, at least in part, on the position of the user terminal, the reference azimuth of the user terminal, and the obtained ephemeris data.

In another example, a user terminal for establishing a communication link with a first satellite associated with a first satellite service is disclosed. The user terminal may include one or more processors and a memory configured to store instructions. Execution of the instructions by the one or more processors may cause the user terminal to determine a position of the user terminal on Earth based, at least in part, on location information provided by a satellite positioning system (SPS) receiver associated with the user terminal. Execution of the instructions by the one or more processors may also cause the user terminal to determine a reference azimuth of the user terminal based, at least in part, on a position of a second satellite associated with a second satellite service that is different than the first satellite service. Execution of the instructions by the one or more processors may also cause the user terminal to obtain ephemeris data for the first satellite, and align a directional antenna of the user terminal with the first satellite based, at least in part, on the position of the user terminal, the reference azimuth of the user terminal, and the obtained ephemeris data.

In another example, a non-transitory computer-readable medium is disclosed. The non-transitory computer-readable medium may store instructions that, when executed by one or more processors of a user terminal, may cause the user terminal to determine a position of the user terminal on Earth based, at least in part, on location information provided by a satellite positioning system (SPS) receiver associated with the user terminal. Execution of the instructions by the one or more processors may also cause the user terminal to determine a reference azimuth of the user terminal based, at least in part, on a position of a second satellite associated with a second satellite service that is different than the first satellite service. Execution of the instructions by the one or more processors may also cause the user terminal to obtain ephemeris data for the first satellite, and align a directional antenna of the user terminal with the first satellite based, at least in part, on the position of the user terminal, the reference azimuth of the user terminal, and the obtained ephemeris data.

BRIEF DESCRIPTION OF THE DRAWINGS

Aspects of this disclosure are illustrated by way of example and are not intended to be limited by the figures of the accompanying drawings.

Like reference numerals refer to corresponding parts throughout the drawing figures.

DETAILED DESCRIPTION

Figure 1:
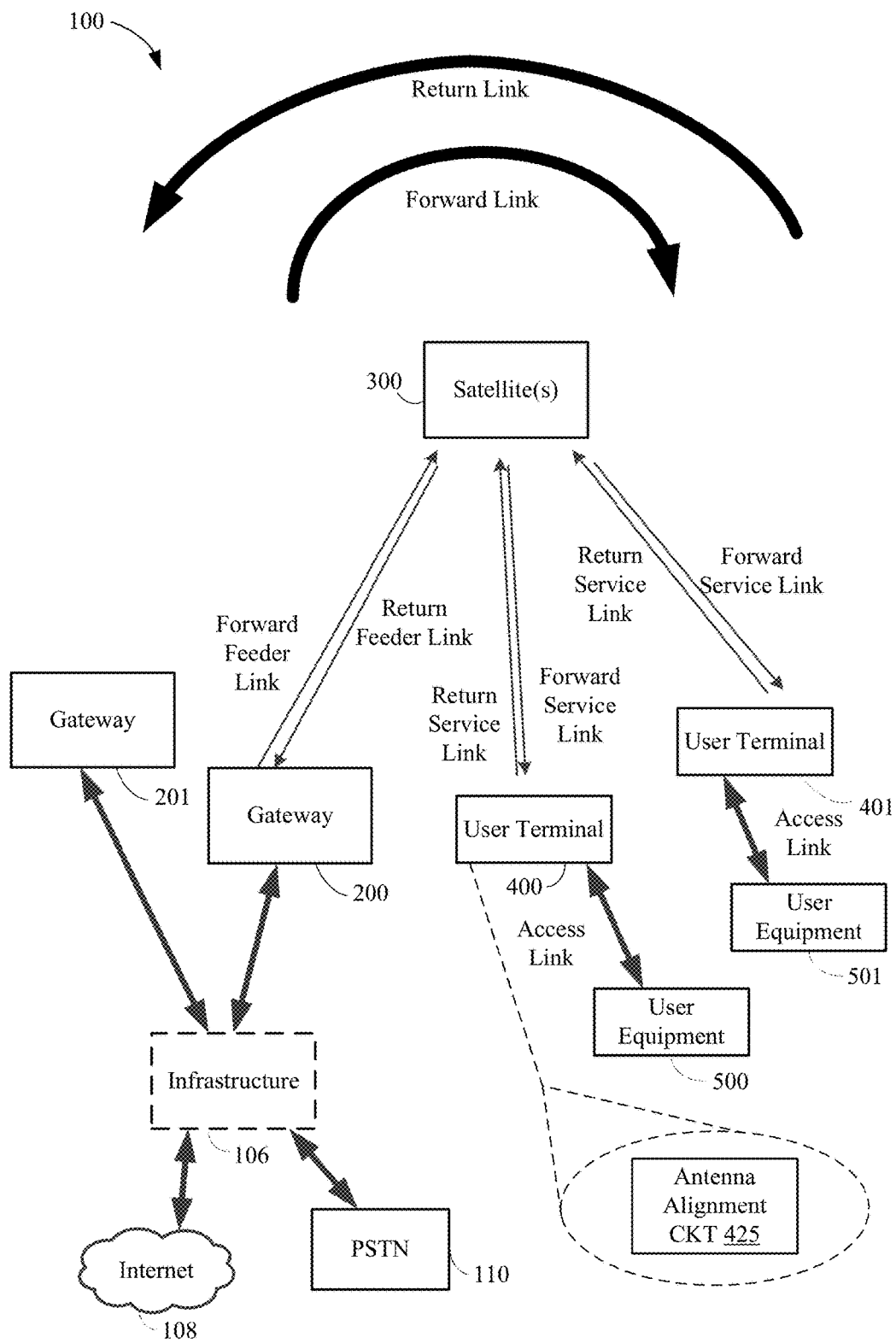
FIG. 1 shows a block diagram of an example communication system.

The example implementations described herein may allow a user terminal to locate and establish a communication link with a first satellite associated with a first satellite service without having prior knowledge of the user terminal's orientation (e.g., with respect to a direction of true North) and without having experience in locating, identifying, or tracking satellites. As described in more detail below, the user terminal may determine its position on Earth using known satellite positioning techniques, and may then use its determined position to calculate an elevation angle to an arc in the sky along which a number of second satellites associated with a second satellite service may be located. The user terminal may raise an associated directional antenna to the elevation angle, and then rotate the directional antenna in azimuth until one or more signals are received from one of the second satellites. The received signals may be used to verify the second satellite's identity, from which a known position of the second satellite may be determined A reference azimuth may be determined based, at least in part, on the known position of the second satellite and the orientation of the directional antenna. The user terminal may obtain ephemeris data of the first satellite. The user terminal's position, the determined reference azimuth, and the obtained ephemeris data may be used to align the directional antenna with the first satellite, and thereafter establish the communication link with the first satellite. For some implementations, the received signals from the second satellite may include a beacon that contains the ephemeris data for the first satellite.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

As used herein, the terms "ephemeris" and "ephemeris data" refer to satellite orbital information that contains positions of one or more satellites for a number of given times (e.g., in the future). A satellite's position may be expressed using a 3-dimensional coordinate system such as a spherical coordinate system. For example, in a spherical coordinate system, a satellite's position relative to a fixed point on Earth may be represented as a line extending from the fixed point on Earth to the satellite. The line may be expressed as a vector including three numbers: the radial distance of the satellite from the fixed point, the elevation angle, and the azimuth (or azimuth angle). The elevation angle, which may also be referred to as the inclination angle or the polar angle, is the angle between the line and a reference plane parallel to the surface of the Earth. Thus, as used herein, the terms "elevation angle," "inclination angle," and "polar angle" may be interchangeable. The reference plane may be referred to herein as the "azimuth plane," and thus the terms "reference plane" and "azimuth plane" may be interchangeable. The azimuth is the angle between a reference direction and the orthogonal projection of the line onto the azimuth plane. For purposes of discussion herein, the reference direction may correspond to the direction of true North, and may hereinafter be referred to as the reference azimuth. Thus, as used herein, the terms "reference azimuth" and "reference direction" may be interchangeable, and for at some implementations may refer to a direction of true North.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The UT 400 may include an antenna alignment circuit 425 that may allow the UT 400 to align an associated directional antenna (not shown for simplicity) with a first satellite (e.g., satellite 300) associated with a first satellite service. For example implementations, the antenna alignment circuit 425 may locate and receive signals from a second satellite associated with a second satellite service that is different than the first satellite service. In some aspects, the second satellite may be easier to locate than the first satellite, for example, because the second satellite may have known orbital patterns and/or may appear motionless in the sky to a stationary observer on Earth. The antenna alignment circuit 425 may determine a reference azimuth of the UT 400 based, at least in part, on a known position of the second satellite and an orientation of the UT's directional antenna. The antenna alignment circuit 425 may obtain ephemeris data for the first satellite, and thereafter align the UT's directional antenna with the first satellite based, at least in part, on the Earth position of the UT 400, the reference azimuth of the UT 400, and the obtained ephemeris data. In some aspects, the first satellite may be in a non-geosynchronous orbit (NGSO) around Earth, and the second satellite may be in a geosynchronous orbit (GSO) around Earth. In other aspects, the first satellite may be in an NGSO around Earth, and the second satellite may be in a highly elliptical orbit (HEO) around Earth.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
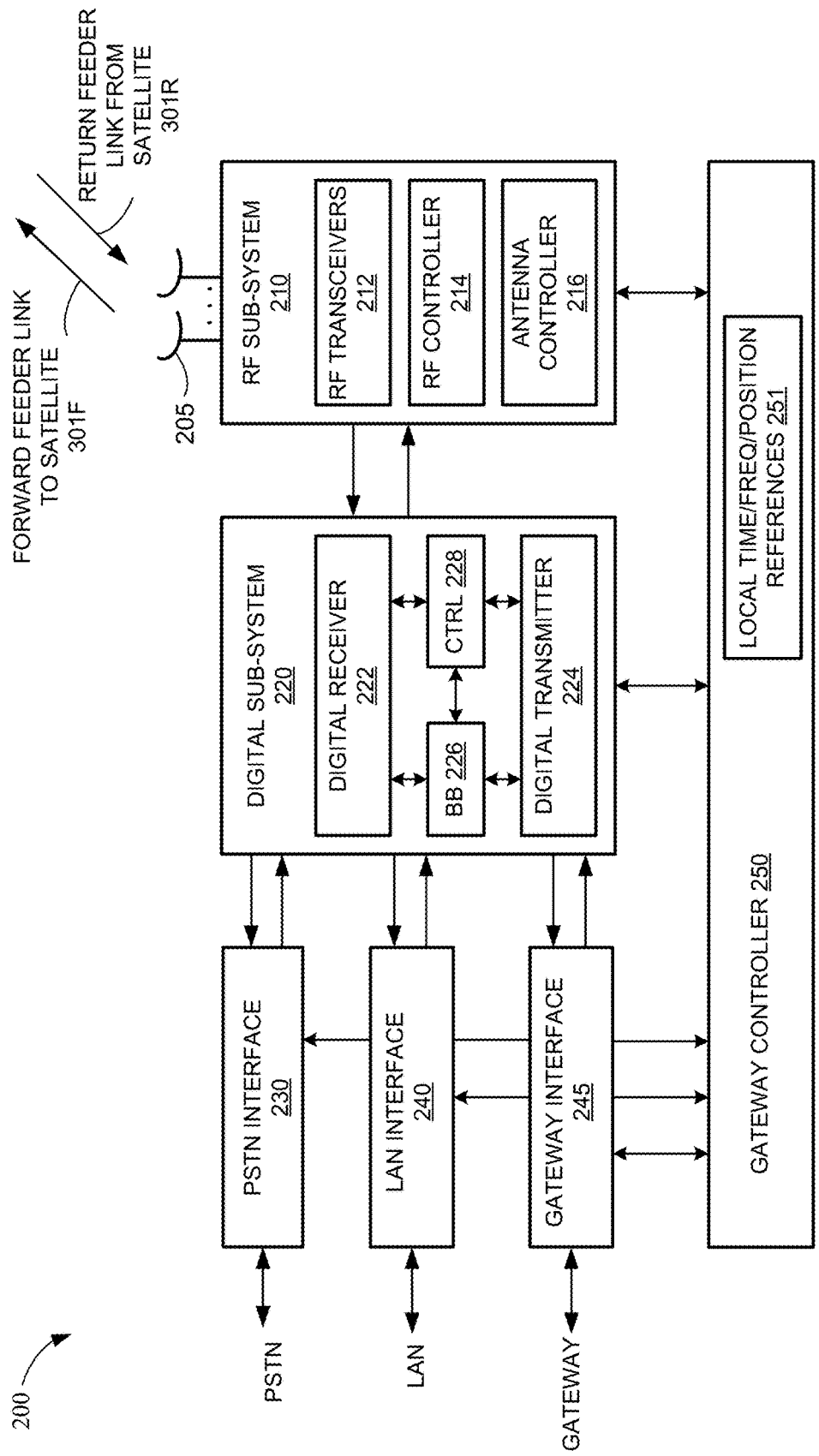
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
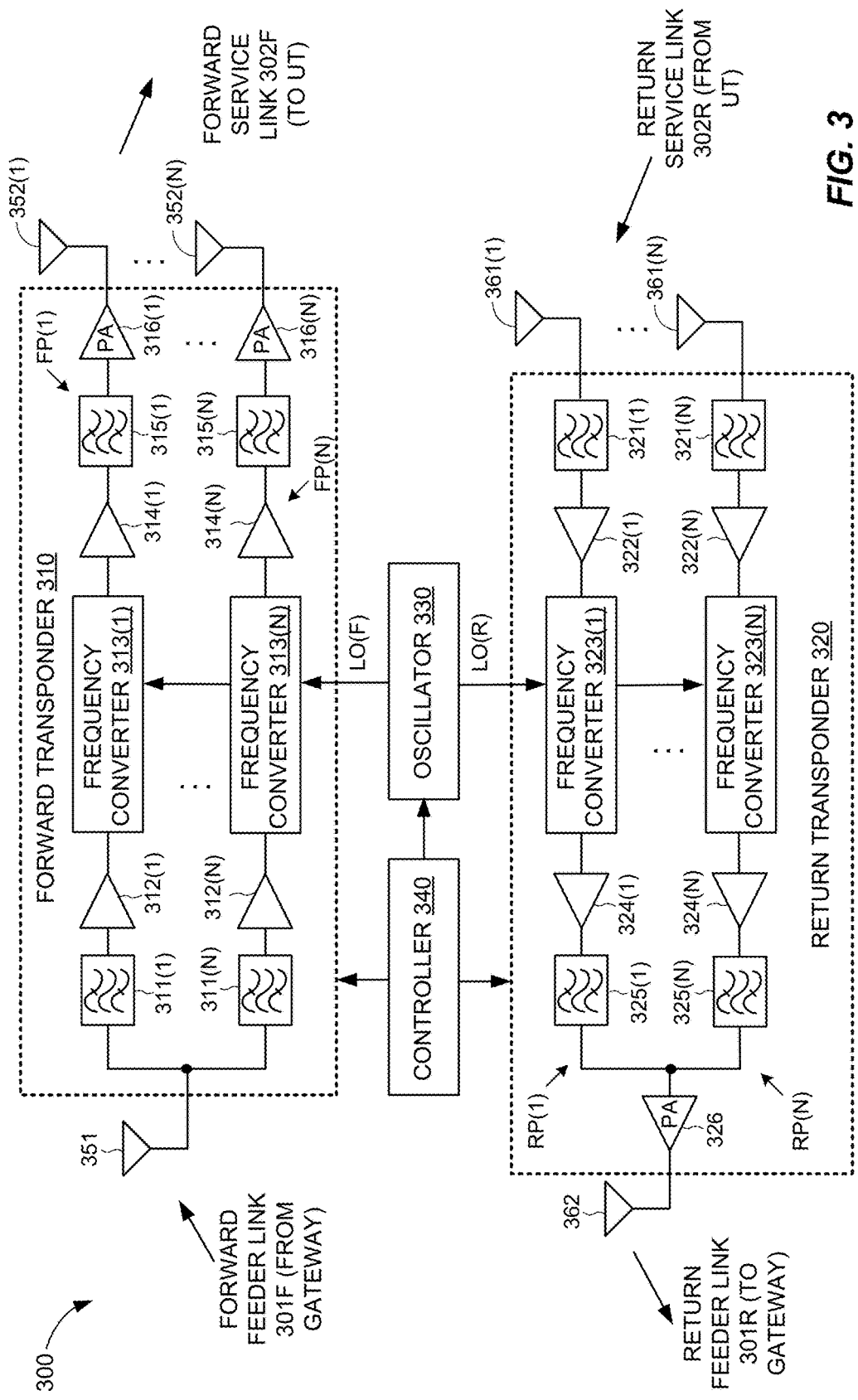
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 10 and 11.

Figure 4:
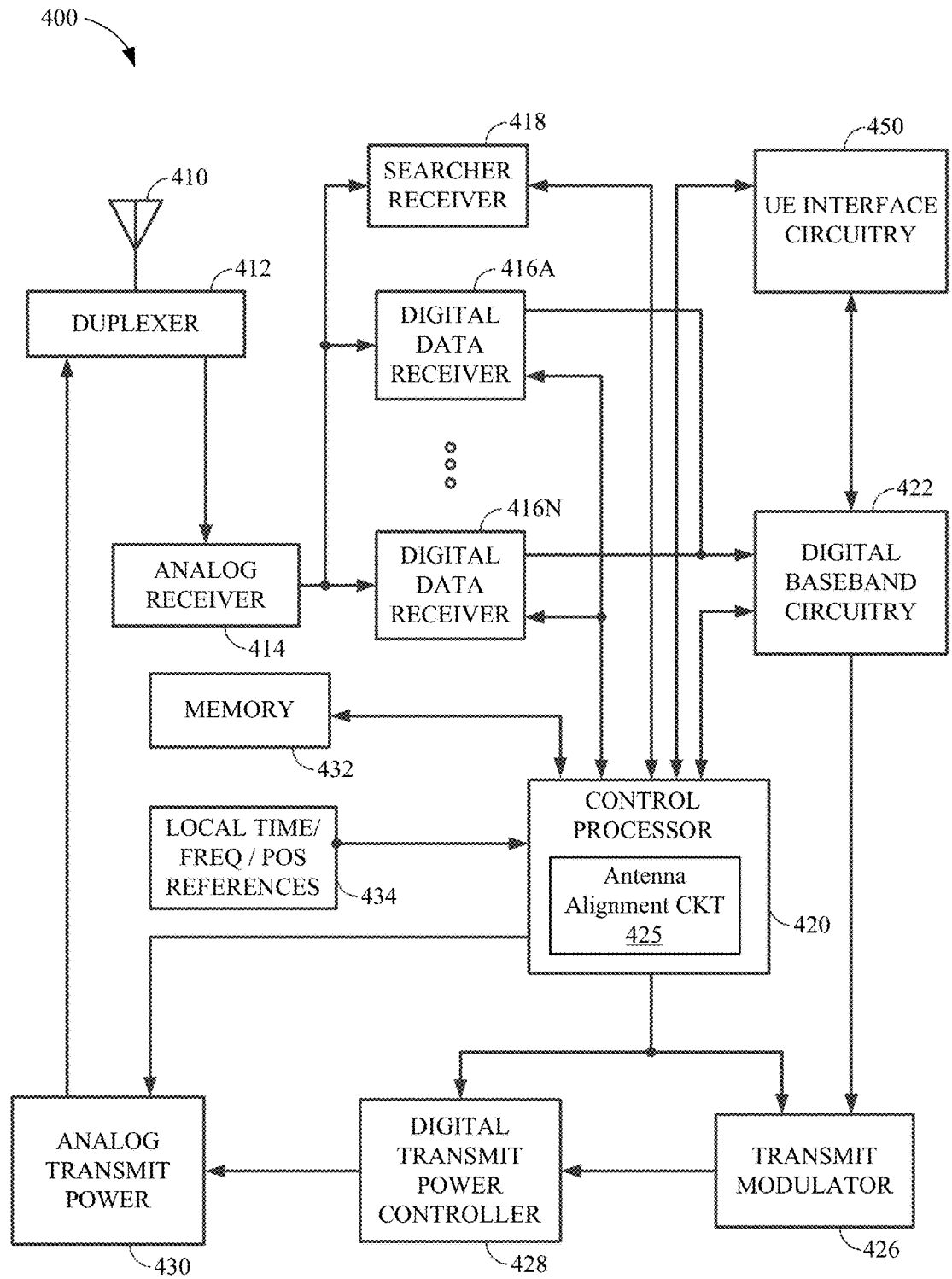
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources. For some implementations, the control processor 420 may include (or may be coupled to) the antenna alignment circuit 425 described above with respect to FIG. 1.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
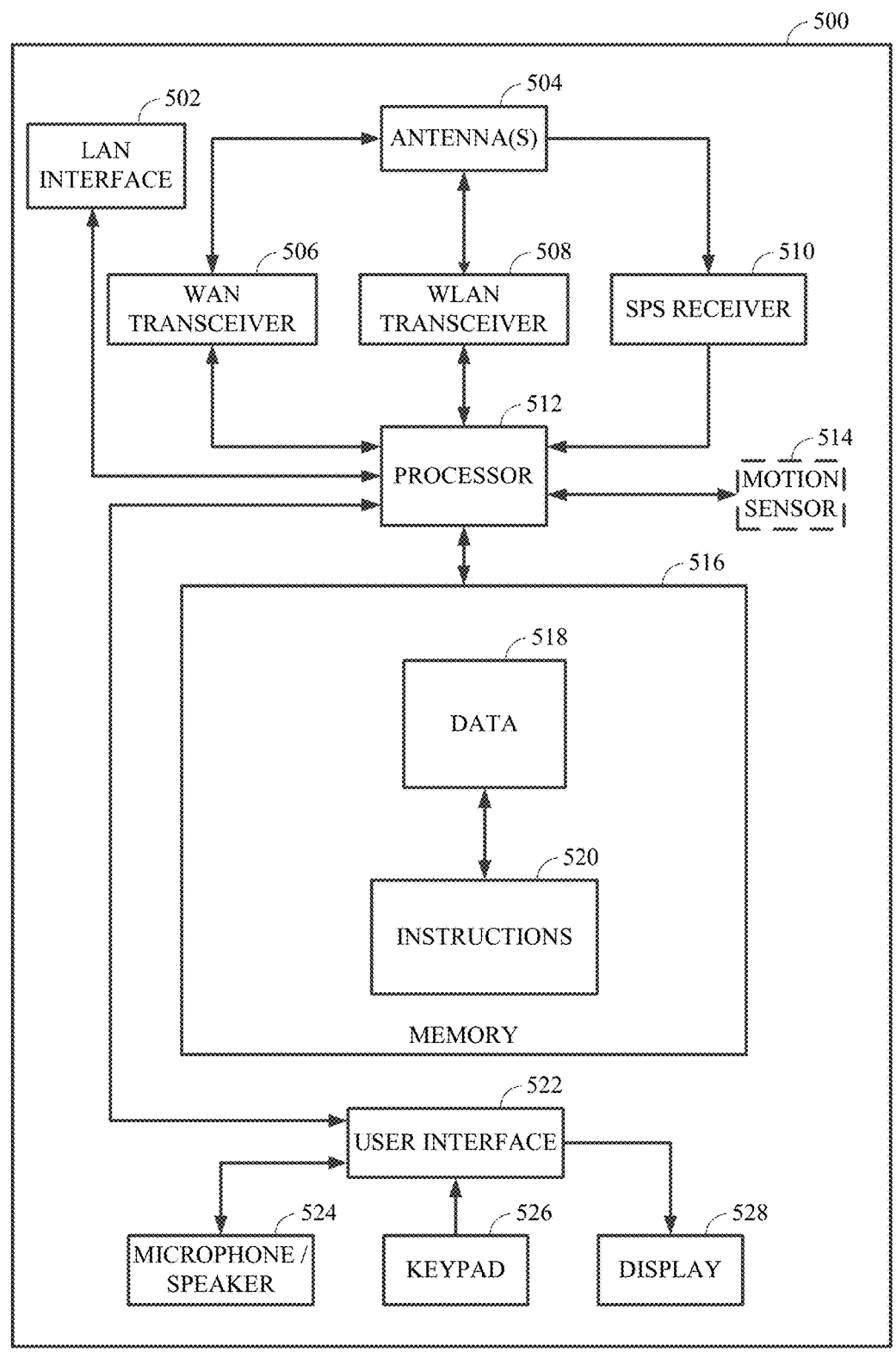
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the earth's surface, and revolve around the Earth in an equatorial orbit at the earth's own angular velocity, for example, such that GSO satellites appear motionless in the sky to a stationary observer on Earth. In contrast, NGSO satellites such as LEO satellites are deployed in non-geostationary orbits and revolve around the earth above various paths of the earth's surface at relatively low altitudes and relatively fast speeds (e.g., as compared with GSO satellites). Because an NGSO satellite moves across the sky very quickly and is typically visible to a given point on Earth for a few minutes at a time, it may be difficult for a user terminal to align its antenna with an NGSO satellite such as satellite 300, especially when the user has little or no experience in locating satellites and/or in determining a reference azimuth (e.g., a direction of true north). In addition, when one or both the UT and the NGSO satellite use high-gain directional antennas to transmit signals to each other, the relatively narrow beam widths associated with directional antennas (e.g., as compared to the relatively wide beam widths associated with omni-directional antennas) may further complicate the process of aligning the UT's antenna with one of the NGSO satellites. As a result, it may be challenging for a user to locate and establish a communication link between a UT and an NGSO satellite such as satellite 300.

Figure 6:
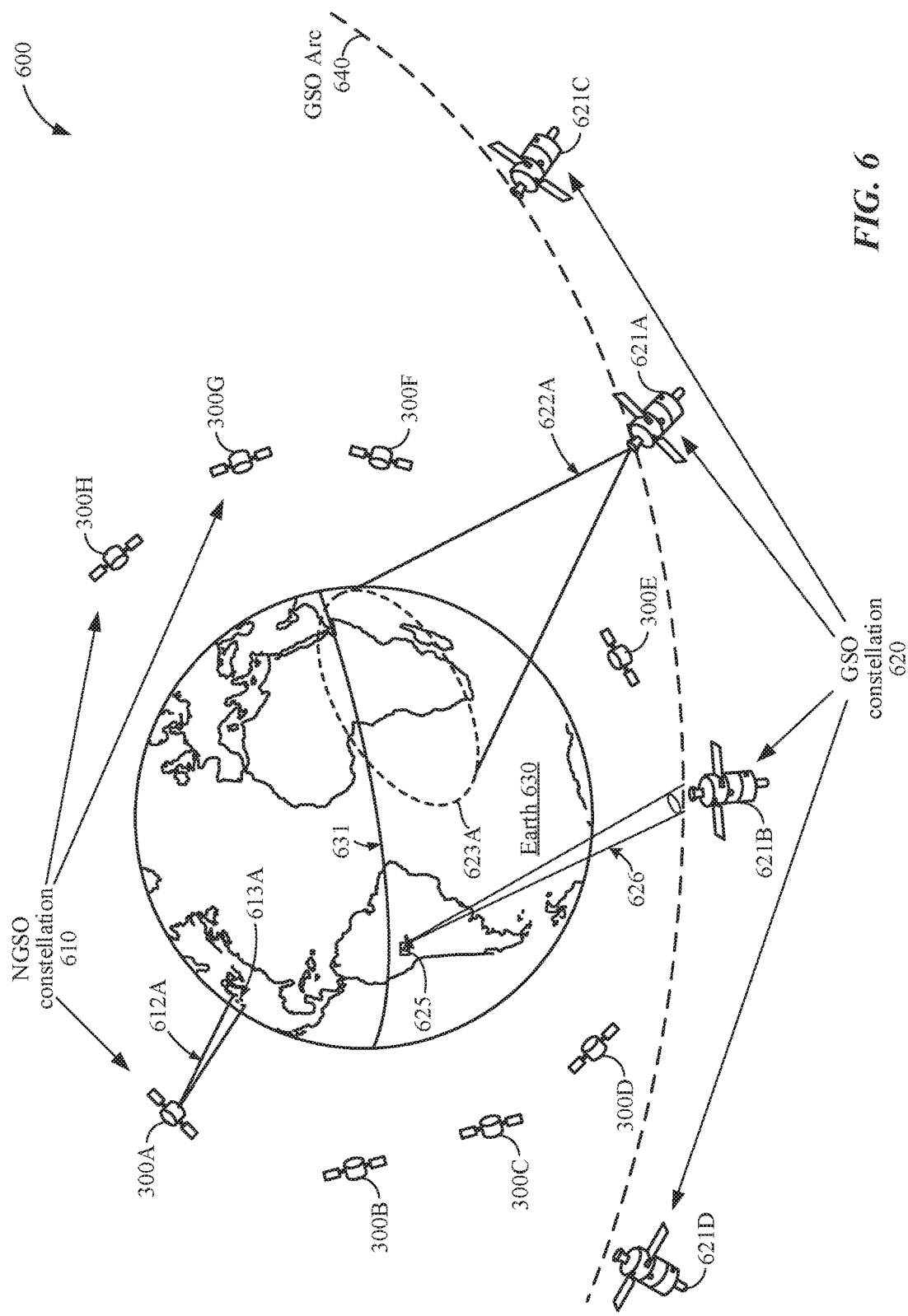
FIG. 6 shows a diagram depicting an example UT on Earth, a number of first satellites associated with a first satellite service, and a number of second satellites associated with a second satellite service.

FIG. 6 shows a diagram 600 depicting the UT 400 of FIG. 1 positioned on a surface of Earth 630. A plurality of first satellites 300A-300H may be part of a first constellation 610 that provides a first satellite service to most, if not all, areas on Earth 630. For at least some implementations, the plurality of first satellites 300A-300H may be in one or more non-geosynchronous orbits (NGSO) around Earth, and thus the first satellites 300A-300H may hereinafter be referred to as NGSO satellites 300A-300H. Further, although the first constellation 610 is shown in FIG. 6 as including only eight satellites 300A-300H for simplicity, the first constellation 610 may include any suitable number of satellites 300, for example, to provide world-wide satellite coverage. In some aspects, each of NGSO satellites 300A-300H may be one example of satellite 300 of FIGS. 1 and 3.

A plurality of second satellites 621A-621D may be part of a second constellation 620 that provides a second satellite service to large portions of Earth. For at least some implementations, the plurality of second satellites 621A-621D may be in a geosynchronous orbit (GSO) around Earth, and thus the second satellites 621A-621D may hereinafter be referred to as GSO satellites 621A-621D. Further, although the second constellation 620 is shown in FIG. 6 as including only four satellites 621A-621D for simplicity, the second constellation 620 may include any suitable number of satellites 621.

For some implementations, the first satellite service may correspond to a broadband Internet access service, and the second satellite service may correspond to a satellite-based broadcast television service or a satellite-based broadcast radio service. For other implementations, the first satellite service may correspond to any suitable satellite service, and the second satellite service may correspond to any suitable satellite service that includes at least one satellite from which the UT 400 may locate and receive signals (e.g., to at least determine a reference azimuth for the UT 400).

The NGSO satellites 300A-300H may orbit the Earth 630 in any suitable number of non-geosynchronous orbital planes (not shown for simplicity), and each of the orbital planes may include a plurality of the first satellites (e.g., NGSO satellites 300A-300H). The non-geosynchronous orbital planes may include, for example, polar orbital patterns and/or Walker orbital patterns. To a stationary observer on Earth 630, the NGSO satellites 300A-300H appear to move quickly across the sky in a plurality of different paths across the Earth's surface. In contrast, the GSO satellites 621A-621D may appear, to a stationary observer on Earth 630, motionless in a fixed position in the sky located above the earth's equator 631. It is noted that for a given point on the surface of Earth 630, there may be an arc of positions in the sky along which the GSO satellites 621A-621D may be located. This arc of GSO satellite positions may be referred to herein as the GSO arc 640.

As mentioned above, each of the NGSO satellites 300A-300H may include a number of directional antennas to provide high-speed forward links (e.g., downlinks) with user terminals such as UT 400 of FIG. 1 and/or with gateways such as gateway 200 of FIG. 1, while each of the GSO satellites 621A-621D may include a number of omni-directional antennas to provide satellite coverage over large portions of the Earth's surface. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A is relatively small compared to the coverage area 623A provided by a beam 622A transmitted from GSO satellite 621A. Accordingly, although not shown in FIG. 6 for simplicity, the footprint of each NGSO satellite 300 may be significantly smaller than the footprint of each GSO satellite 621.

The UT 400 may also include or be associated with one or more directional antennas to provide high-speed return links (e.g., uplinks) to NGSO satellites 300A-300H, and thus a beam 460 transmitted from UT 400 may also have a relatively narrow beam width (e.g., as compared to the relatively wide beam width of an omni-directional antenna typically associated with a GSO earth station, not shown for simplicity). Accordingly, the relatively narrow beam widths associated with UT 400 and NGSO satellites 300A-300H may create challenges for a user terminal attempting to align the directional antenna of UT 400 with a selected one of NGSO satellites 300A-300H, especially when the user does not have experience with locating satellites, aligning a directional antenna on Earth with a rapidly moving NGSO satellite, and/or determining the reference azimuth.

Accordingly, methods and apparatuses are disclosed herein for establishing a communication link between a user terminal such as UT 400 and a first satellite such as one of NGSO satellites 300A-300H. As described in more detail below, a user terminal such as UT 400 may determine its position on Earth 630 based, at least in part, on location information provided by an SPS receiver associated with the UT 400. The user terminal may determine a reference azimuth of the UT 400 based, at least in part, on a position of a second satellite such as one of GSO satellites 621A-621D. After obtaining ephemeris data for the first satellite, the user terminal may align a directional antenna of the UT 400 with the first satellite based, at least in part, on the position of the UT 400, the reference azimuth, and the obtained ephemeris data.

Figure 7:
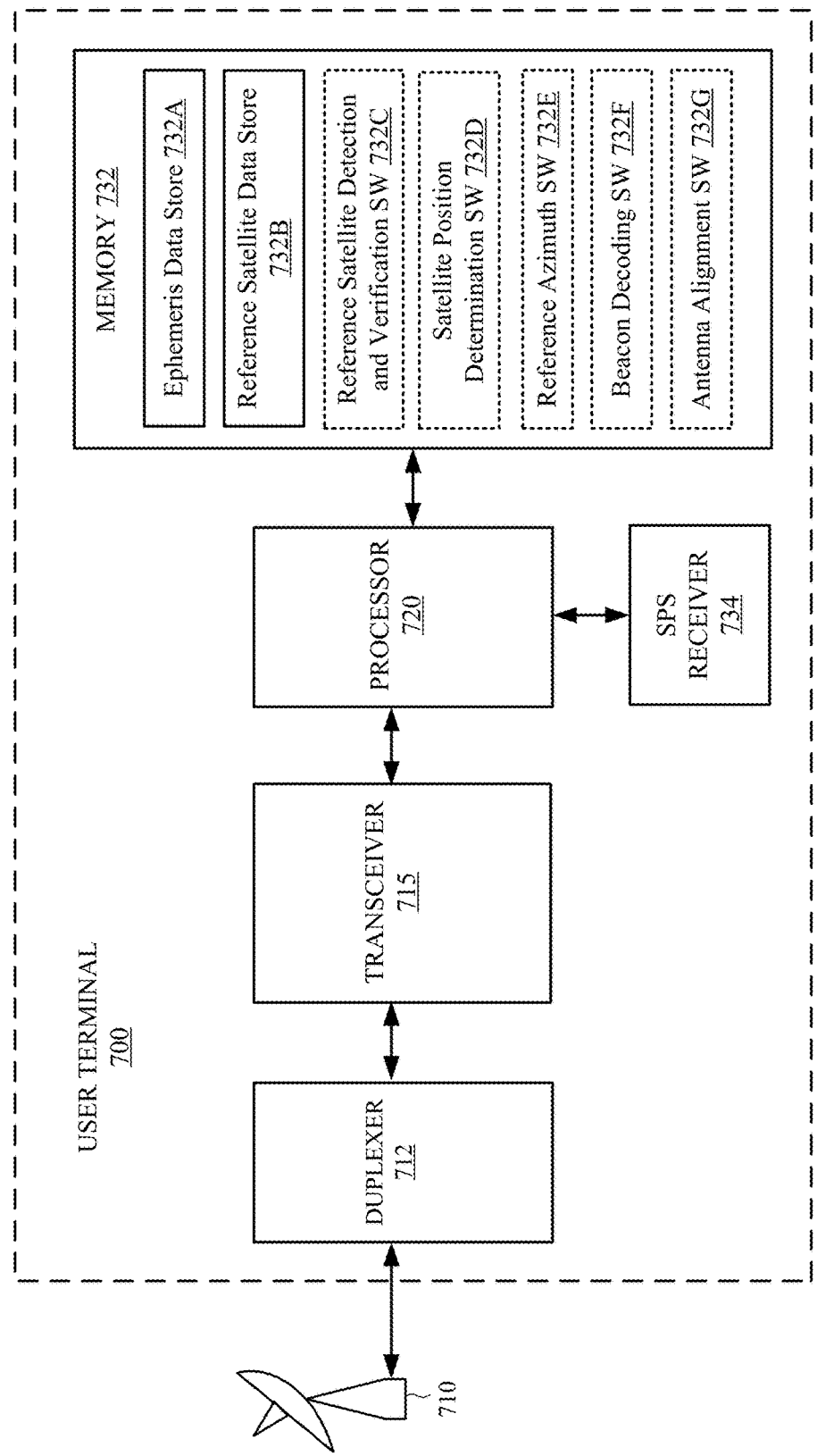
FIG. 7 shows a block diagram of another example of the UT of FIG. 1.

FIG. 7 is a block diagram of a user terminal (UT) 700 in accordance with example implementations. The UT 700, which may be one implementation of the UT 400 of FIG. 1, may include at least a directional antenna 710, a duplexer 712, a transceiver 715, a processor 720, a memory 732, and a satellite positioning system (SPS) receiver 734. The duplexer 712, which may correspond to duplexer 412 of FIG. 4, may selectively route signals received from one or more satellites via directional antenna 710 to transceiver 715, and may selectively route signals from transceiver 715 to directional antenna 710 for transmission to one or more satellites.

The transceiver 715, which may correspond to the analog receiver 414, digital receivers 416A-416N, transmit modulator 426, and/or analog transmit power 430 of FIG. 4, may be coupled to directional antenna 710 via duplexer 712. More specifically, the transceiver 715 may be used to transmit signals to and receive signals from a number of satellites such as, for example, GSO satellites, NGSO satellites, HEO satellites, and/or positioning satellites. Although not shown in FIG. 7 for simplicity, the transceiver 715 may include any suitable number of transmit chains and/or may include any suitable number of receive chains.

The processor 720, which may be one implementation of the control processor 420 of FIG. 4, is coupled to transceiver 715, to SPS receiver 734, and to memory 732. The processor 720 may be any suitable one or more processors capable of executing scripts or instructions of one or more software programs stored in the UT 700 (e.g., within memory 732).

The SPS receiver 734, which may be one implementation of the local time, frequency and/or position references 434 of FIG. 4, may be used to determine the position of the UT 700 on Earth (e.g., latitude, longitude, and/or altitude) using signals received from a number of positioning satellites. For at least some aspects, the SPS receiver 734 may be compatible with the Global Positioning System (GPS), the Global Navigation Satellite System (GLONASS), and/or any other global or regional satellite based positioning system. For example, to determine the latitude, longitude, and altitude coordinates of UT 700, the SPS receiver 734 may receive time and location information from at least four positioning satellites, and use well-known trilateration techniques to derive the UT's position on Earth. It is noted that the latitude and longitude coordinates of UT 400 may be determined using only three positioning satellites. In addition, for other implementations, the UT 700 may receive its position information from an external SPS receiver such as, for example, SPS receiver 510 of UE 500 (see also FIG. 5).

The directional antenna 710, which may be one implementation of antenna 410 of FIG. 4, may be any suitable high-gain directional antenna capable of transmitting signals to and receiving signals from a number of satellites in various orbits and/or associated with various constellations or satellite services. For at least some implementations, the directional antenna 710 may be configured to transmit and receive signals in a variety of different frequency bands that may be associated with a number of different satellite constellations and/or satellite services. Although not shown in FIG. 7 for simplicity, the directional antenna 710 may include one or more mechanisms (e.g., manual and/or automated) to adjust the elevation angle and/or to adjust the azimuth of the directional antenna 710. Further, although FIG. 7 depicts UT 700 as including or associated with one directional antenna 710, for other implementations, the UT 700 may include or be associated with more than one directional antenna 710.

The memory 732, which may be one implementation of memory 432 of FIG. 4, may include an ephemeris data store 732A to store ephemeris data for a first constellation with which the UT 700 is to establish a communication link. For example, referring also to FIG. 6, the ephemeris data may contain detailed orbital information about each of the NGSO satellites 300A-300H of the first constellation 610. Based on the ephemeris data, the Iii' 700 may determine the precise time at which a number of the Nd satellites 300A-300H will come into range of UT 7(X) (e.g., within the beam width of the directional antenna 710).

The memory 732 may include a reference satellite data store 732B to store ephemeris and related information for a number of other satellites and/or other satellite constellations. For example, the reference satellite data store 732B may store detailed orbital information about each of a plurality of GS( ) satellites (e.g., GSO satellites 621A-621D of FIG. 6), may store detailed orbital information about each of a plurality of positioning satellites (e.g., positioning satellites 802A-802D of FIG. 8A), and/or may store detailed orbital information about each of a plurality of HEO satellites.

Figure 9A:
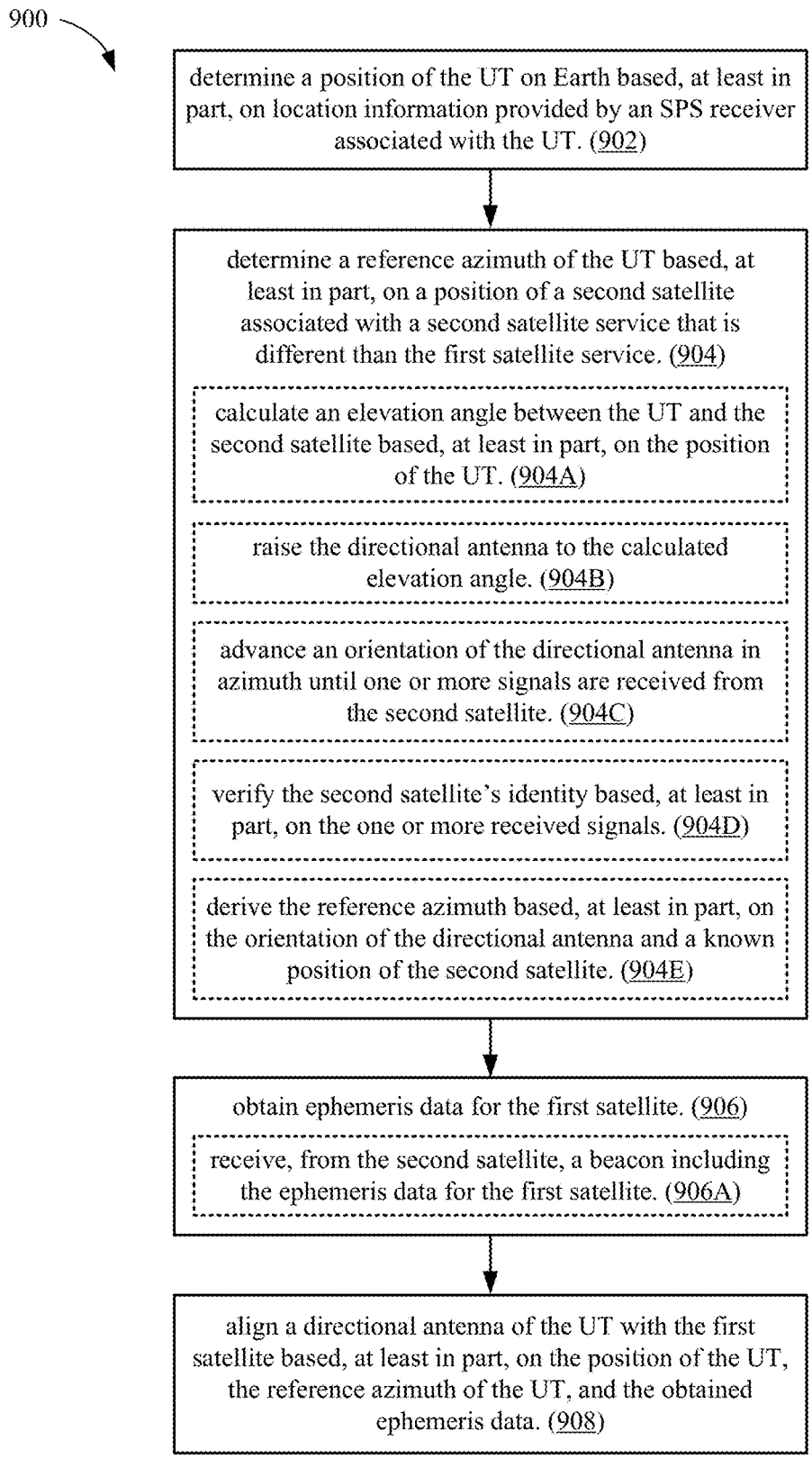
FIGS. 9A-9C show illustrative flowcharts depicting example operations for establishing a communication link between a user terminal and a selected one of the first satellites of FIG. 6.
Figure 9B:
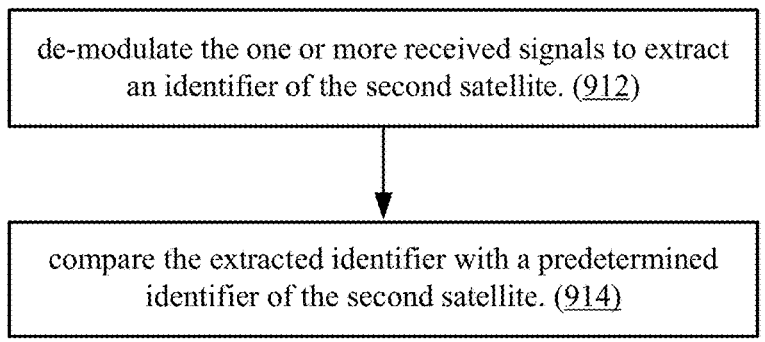
Figure 9C:
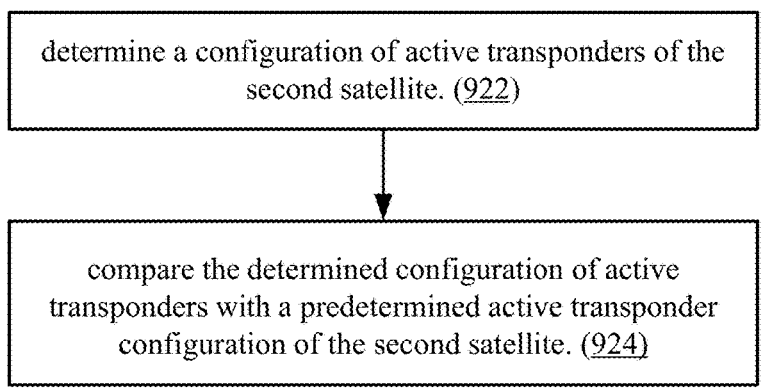

The memory 732 may include a non-transitory computer-readable storage medium (e.g., one or more nonvolatile memory elements, such as EPROM, EEPROM, Flash memory, a hard drive, and so on) that may store the following software modules (SW):

- a reference satellite detection and verification SW module 732C to detect one or more reference satellites (e.g., the GSO satellites 621A-621D of FIG. 6) based, at least in part, on received signal strength indicator (RSSI) values and/or active transponder configurations of the reference satellites, and to verify the identity of the detected reference satellites, for example, as described for one or more operations of FIGS. 9A-9C;
- a satellite position determination SW module 732D to determine the positions of reference satellites detected and verified by the reference satellite detection and verification SW module 732C, and/or to determine the positions of one or more satellites associated with the first constellation 610 (e.g., NGSO satellites 300A-300H), for example, as described for one or more operations of FIGS. 9A-9C;
- a reference azimuth SW module 732E to determine the reference azimuth (e.g., the direction of true North) for UT 700 based, at least in part, on the position of a reference satellite and an orientation of the directional antenna 710, for example, as described for one or more operations of FIGS. 9A-9C;
- a beacon decoding SW module 732F to decode or otherwise extract ephemeris data for a number of satellites in the first constellation 610 from beacons transmitted from one or more of the reference satellites, for example, as described for one or more operations of FIGS. 9A-9C; and
- an antenna alignment SW module 732G to aim, point, or otherwise align the directional antenna 710 with a selected satellite based, at least in part, on ephemeris data for the selected satellite and the determined reference azimuth, for example, as described for one or more operations of FIGS. 9A-9C.

Each software module includes instructions that, when executed by processor 720, cause the UT 700 to perform the corresponding functions. The non-transitory computer-readable medium of memory 732 thus includes instructions for performing all or a portion of the operations of FIGS. 9A-9C.

For example, processor 720 may execute the reference satellite detection and verification SW module 732C to detect one or more reference satellites (e.g., the GSO satellites 621A-621D of FIG. 6) based, at least in part, on received signal strength indicator (RSSI) values and/or active transponder configurations of the reference satellites, and to verify the identity of the detected reference satellites. Processor 720 may execute the satellite position determination SW module 732D to determine the positions of reference satellites detected and verified by the reference satellite detection and verification SW module 732C, and/or to determine the positions of one or more satellites associated with the first constellation 610 (e.g., NGSO satellites 300A-300H). Processor 720 may execute the reference azimuth SW module 732E to determine the reference azimuth (e.g., the direction of true North) for UT 700 based, at least in part, on the position of a reference satellite and an orientation of the directional antenna 710. Processor 720 may execute the beacon decoding SW module 732F to decode or otherwise extract ephemeris data for a number of satellites in the first constellation 610 from beacons transmitted from one or more of the reference satellites. Processor 720 may execute the antenna alignment SW module 732G to aim, point, or otherwise align the directional antenna 710 with a selected satellite based, at least in part, on ephemeris data for the selected satellite and the determined reference azimuth.

For at least some implementations, the SW modules 732C-732G stored in memory 732 may correspond to the antenna alignment circuit 425 of FIG. 1.

As described below with respect to FIGS. 8A-8D, the example implementations may allow a user, such as a homeowner, to align the directional antenna 710 of UT 700 with a first satellite associated with a first satellite constellation (such as one of the NGSO satellites 300A-300H of FIG. 6) without an accurate reference azimuth (e.g., without knowing the precise direction of true North). In addition, at least some example implementations may allow the user to establish a communication link with the first satellite without having knowledge of the first satellite's ephemeris.

Figure 8A:
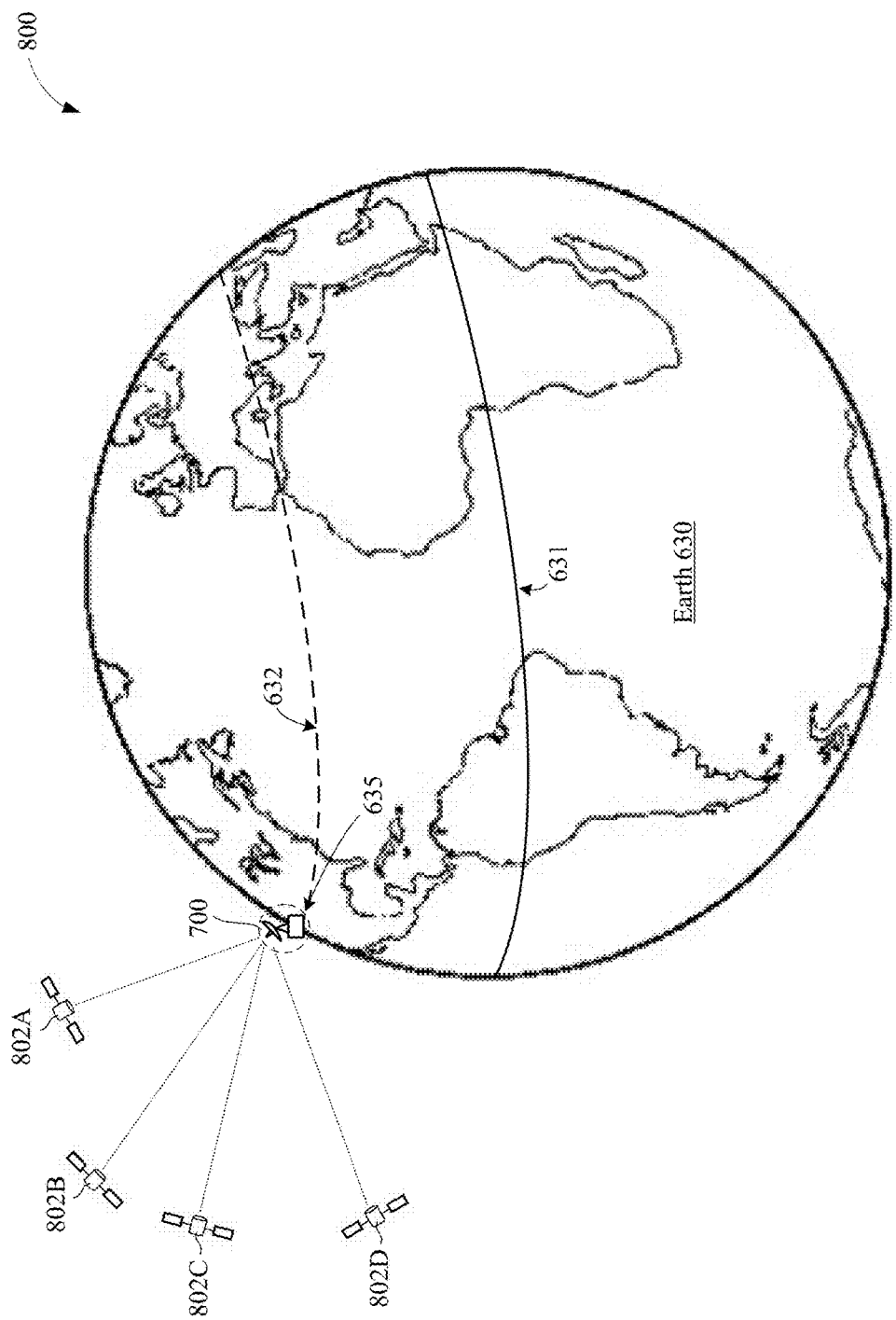
FIG. 8A shows a diagram depicting the UT of FIG. 7 in communication with four positioning satellites.
Figure 8B:
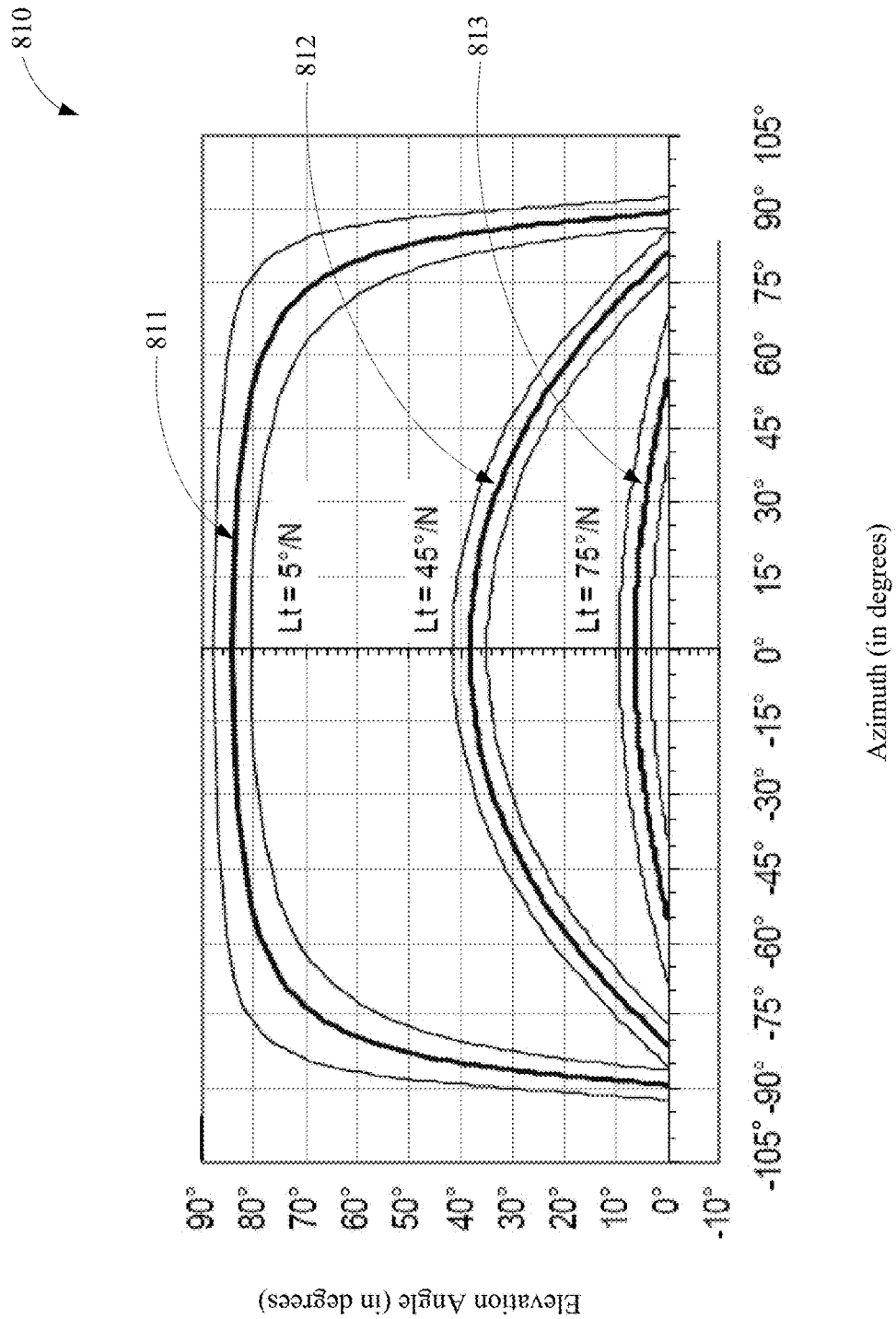
FIG. 8B shows a graph depicting a relationship between elevation angles to the GSO arc and azimuth for several example latitudes on Earth.

FIG. 8A shows a diagram 800 depicting the UT 700 positioned at a location 635 on Earth 630, and having a line-of-sight with four positioning satellites 802A-802D. Although not shown for simplicity, the positioning satellites 802A-802D may be part of a larger constellation that provides global or regional satellite-based location and positioning services (e.g., a constellation of GPS satellites, a constellation of GLONASS satellites, and so on). Referring also to FIG. 7, the SPS receiver 734 of UT 700 may use time and location information received from the positioning satellites 802A-802D to determine the precise position (e.g., latitude, longitude, and altitude) of the UT's location 635. For the example of FIG. 8A, the UT's location 635 is determined to be at a latitude 632 that is north of the equator 631.

The UT 700 may then locate one or more second satellites (e.g., reference satellites) based, at least in part, on the determined position of the UT 700. More specifically, the UT 700 may use the determined latitude 632 of its location 635 to calculate an elevation angle between the azimuth plane and the GSO arc 640. The relationship between latitude and the elevation angle to the GSO arc 640 is well known, and is therefore not discussed in detail herein. In general, as the degree of latitude increases (e.g., as the position of UT 700 moves away from the equator 631), the elevation angle to the GSO arc 640 decreases and reaches a minimum value of 0 degrees at the Earth's poles; conversely, as the degree of latitude decreases (e.g., as the position of UT 700 moves towards the equator 631), the elevation angle to the GSO arc 640 increases and reaches a maximum value of 90 degrees at the equator 631. An illustrative relationship between several example latitudes and the elevation angle to the GSO arc, as a function of azimuth, is depicted in a graph 810 of FIG. 8B. More specifically, the graph 810 includes a first plot 811 depicting a relationship between elevation angle and azimuth for a latitude of 5° N, includes a second plot 812 depicting a relationship between elevation angle and azimuth for a latitude of 45° N, and includes a third plot 813 depicting a relationship between elevation angle and azimuth for a latitude of 75° N.

Figure 8C:
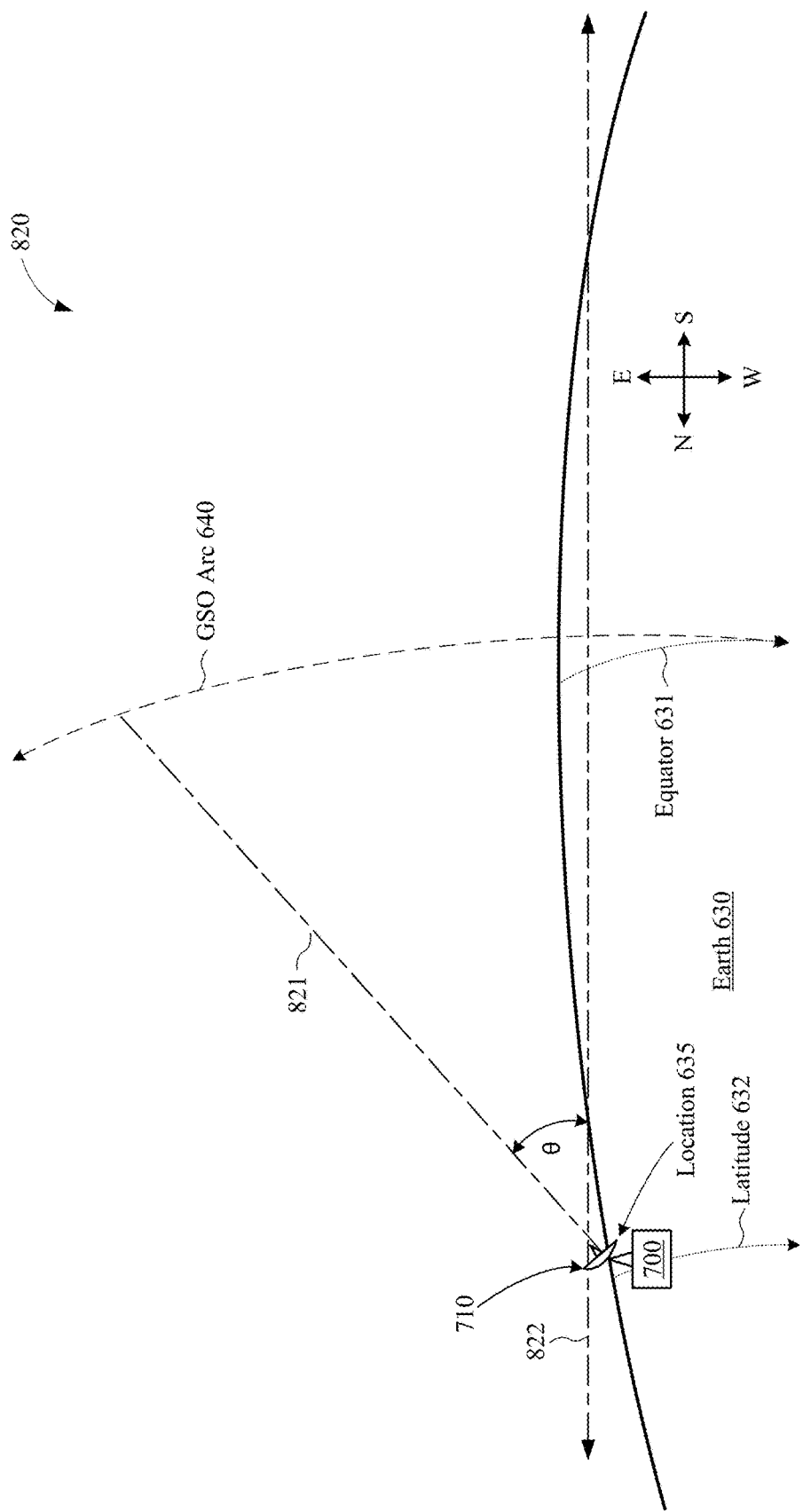
FIG. 8C shows a diagram depicting raising a directional antenna of the UT of FIG. 7 to an elevation angle associated with the GSO arc.

As discussed above with respect to FIG. 6, the GSO arc 640 may define an arc of positions in the sky along which a plurality of GSO satellites such as GSO satellites 621A-621D are located. Accordingly, aiming or pointing the UT's directional antenna 710 at the GSO arc 640 may allow the UT 700 to locate and receive signals from a selected GSO satellite (e.g., when the selected GSO satellite is positioned within the beam width of the directional antenna 710). For example, FIG. 8C shows a diagram 820 depicting the UT's directional antenna 710 raised to the calculated elevation angle (A). For the example diagram 820 of FIG. 8C, the elevation angle (A) is depicted as the angle between (1) a line 821 extending between the UT 700 and the GSO arc 640 and (2) the azimuth plane 822. Once the UT's directional antenna 710 is pointed to the GSO arc 640, the UT 700 may then advance an orientation of the directional antenna 710 in azimuth (e.g., by rotating the directional antenna 710 in the azimuth plane 822) until one or more signals transmitted from a GSO satellite are detected.

Figure 8D:
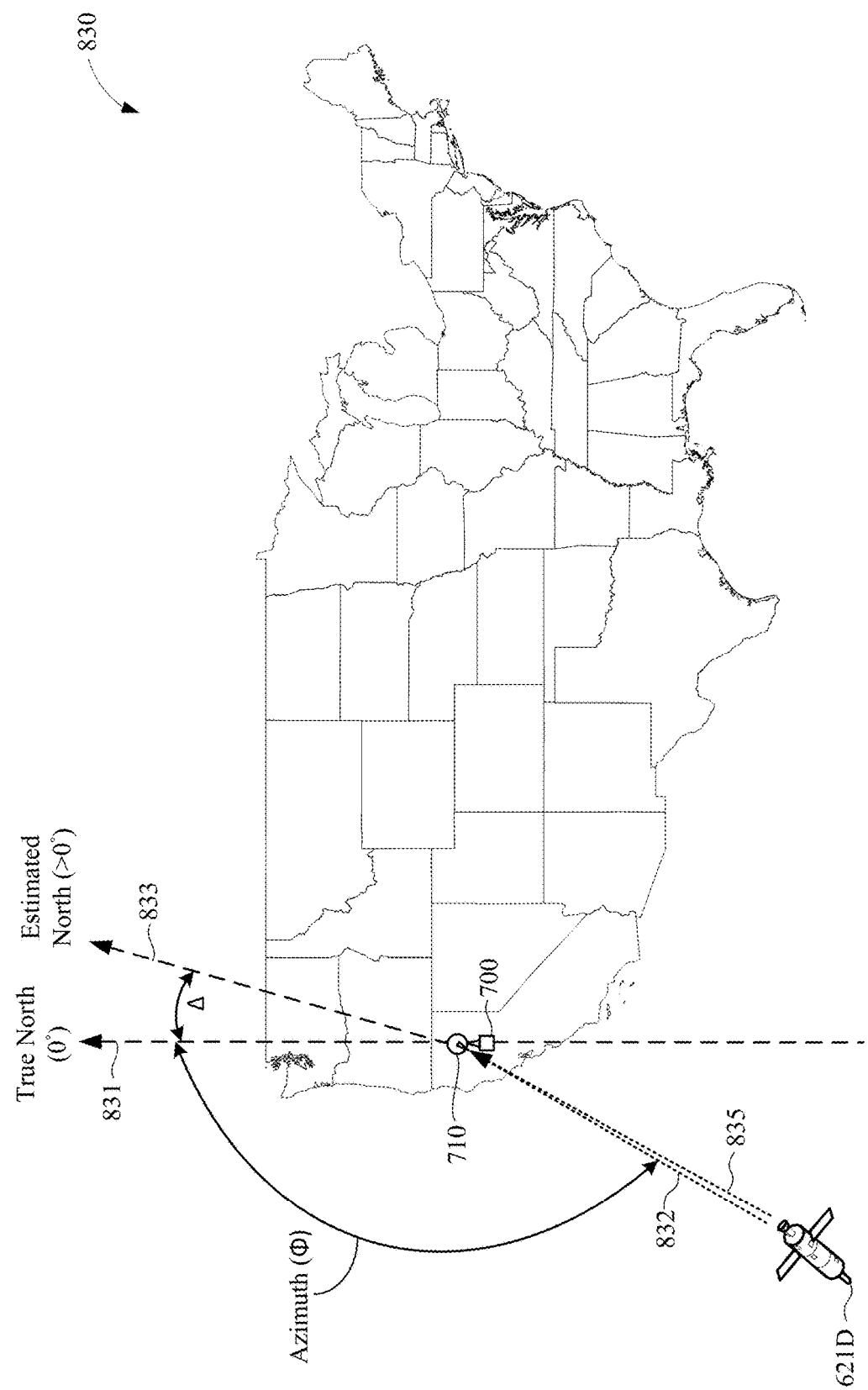
FIG. 8D shows a diagram depicting the UT of FIG. 7 determining a reference azimuth based on position information of one of the second satellites of FIG. 6.

For example, FIG. 8D shows a diagram 830 depicting the UT 700 receiving a signal 832 transmitted from GSO satellite 621D at a given time. As depicted in the example of FIG. 8D, the UT 700 receives signal 832 when the directional antenna 710 is oriented in azimuth at an azimuth angle (Φ). The UT 700 may detect signal 832 and/or determine an identity of the GSO satellite 621D in any suitable manner. For at least some implementations, the UT 700 may measure RSSI values (or other indicators of signal strength) of received satellite signals, and then peak the received satellite signals to determine an alignment of directional antenna 710 that results in a maximum signal strength for the received satellite signals. The resulting alignment of directional antenna 710 may then indicate a position of the GSO satellite 621D of FIG. 8D. Alternatively (or additionally), the UT 700 may detect a configuration of active transponders of the GSO satellite 621D, and then compare the detected configuration of active transponders with a predetermined active transponder configuration of the GSO satellite 621D to align the directional antenna 710 with the GSO satellite 621D. In some aspects, the comparison between the detected configuration of active transponders and the predetermined active transponder configuration may be used to determine and/or verify an identity of the GSO satellite 621D. In some aspects, the predetermined active transponder configuration of the GSO satellite 621D may be publically available. In other aspects, predetermined active transponder configurations of the GSO satellite 621D may be obtained from an operator of the GSO satellite 621D.

For other implementations, the UT 700 may demodulate the received satellite signals (e.g., signal 832) to extract information identifying the GSO satellite 621D. The extracted information may include, for example, a provider name and/or service name for the GSO satellite 621D. The UT 700 may then compare the extracted identifier with a predetermined identifier of the GSO satellite 621D to verify the identity of the GSO satellite 621D. In some aspects, the predetermined identifier of the GSO satellite 621D may be publically available. In other aspects, the predetermined identifier of the GSO satellite 621D may be obtained from an operator of the GSO satellite 621D.

Once the identity of the GSO satellite 621D is determined and/or verified, the UT 700 may use the orientation of its directional antenna 710 and a known position of the GSO satellite 621D at the given time to derive the reference azimuth. More specifically, the UT 700 may use its precise position on Earth (e.g., determined from positioning information provided by SPS receiver 734), the calculated elevation angle, and its orientation in azimuth to calculate the position of the GSO satellite 621D at the given time. Then, the UT 700 may compare the calculated position of the GSO satellite 621D at the given time with a known position of the GSO satellite 621D at the given time to generate difference information. The difference information may be used to derive the reference azimuth for the UT 700.

For the example of FIG. 8D, the UT 700 is depicted as calculating the position of the GSO satellite 621D using an erroneous reference azimuth denoted by a line 833 indicating an estimated direction of true North. The direction indicated by line 833 is off-axis from the direction of true North, as denoted by a line 831, by an error angle (A). By comparing the calculated position of the GSO satellite 621D with the known position of the GSO satellite 621D, the UT 700 may determine a value of the error angle (A), and then derive the reference azimuth (corresponding to line 831 pointing in the direction of true North) using well-known techniques.

The known position of the GSO satellite 621D at the given time may be provided to UT 700 in any suitable manner. For some implementations, ephemeris data for the GSO satellite 621D may be readily available to a user of UT 700. For example, as mentioned above, the GSO satellite 621D may be part of a constellation that provides a satellite-based broadcast television service. For such implementations, the ephemeris data for GSO satellite 621D may be publically available and/or may be obtained from an operator of the satellite-based broadcast television service. For other implementations, the known position of the GSO satellite 621D at the given time may be derived from time and location information provided within the received signal 832.

Once the UT 700 has determined its precise position on Earth and determined the reference azimuth (e.g., and therefore determined the precise orientation of directional antenna 710 in azimuth and elevation angle), the UT 700 may use ephemeris data for the constellation 610 of NGSO satellites 300A-300H to locate and align its directional antenna 710 with a selected one of the NGSO satellites 300A-300H. For some implementations, ephemeris data for the constellation 610 of NGSO satellites 300A-300H may be provided on a beacon transmitted from one or more reference satellites such as GSO satellites 621A-621D of FIG. 6. More specifically, referring again to FIG. 8D, the GSO satellite 621D may transmit a beacon 835 containing ephemeris data for one or more of the NGSO satellites 300A-300H associated with the first satellite service. The UT 700 may receive the beacon 835, and thereafter demodulate or decode the embedded ephemeris data for the one or more of the NGSO satellites 300A-300H. In this manner, the UT 700 may use satellites associated with a second satellite service (e.g., GSO satellites 621A-621D) to obtain ephemeris data for one or more satellites associated with a first satellite service (e.g., NGSO satellites 300A-300H).

The beacon 835 transmitted from GSO satellite 621D may be any suitable signal that contains ephemeris data for satellites associated with the first satellite service. For some implementations, the beacon 835 may be a low data rate signal that shares a transponder (not shown for simplicity) of GSO satellite 621D with other traffic (e.g., to reduce the cost of transmitting the beacon 835 from the GSO satellite GSO satellite 621D). In some aspects, the beacon 835 may be a subcarrier of another signal transmitted from the GSO satellite 621D by the transponder.

Transmission of the beacon 835 may be associated with a modulation scheme that is easily recognizable by the UT 700, for example, so that the UT 700 may quickly identify the beacon 835 from a number of received satellite signals. In addition, encoding ephemeris data onto the beacon 835 using a modulation scheme that is easily recognizable by the UT 700 may also increase the speed and/or ease with which the UT 700 may align its directional antenna 710 with the GSO satellite 621D. In some aspects, the ephemeris data may be encoded onto the beacon 835 using a first modulation scheme that is different than a second modulation scheme typically used by the GSO satellite 621D to broadcast information to customers of the second satellite service.

FIG. 9A is an illustrative flow chart depicting an example operation 900 for establishing a communication link between a user terminal and a first satellite associated with a first satellite service. The example operation 900 may be performed by the UT 700 depicted in FIG. 7. However, it is to be understood that operation 900 may be performed, either entirely or partially, by another suitable receiving device (e.g., another UT and/or a user equipment such as UE 500 of FIG. 5). For the example operation 900 described below with respect to FIG. 9A, the first satellite may correspond to a selected one of the NGSO satellites 300A-300H of FIG. 6, the first satellite service may correspond to the satellite service provided by the first constellation 610 of FIG. 6, the second satellite may correspond to a selected one of the GSO satellites 621A-621D of FIG. 6, and the second satellite service may correspond to the satellite service provided by the second constellation 620 of FIG. 6.

First, a position of the UT 700 on Earth is determined based, at least in part, on location information provided by an SPS receiver associated with the UT 700 (902). The UT's position may be determined, for example, using the SPS receiver 734 of FIG. 7.

Then, a reference azimuth of the UT 700 is determined based, at least in part, on a position of a second satellite associated with a second satellite service that is different than the first satellite service (904). The reference azimuth of the UT 700 may be determined, for example, by executing the reference azimuth SW module 732E of FIG. 7.

For at least some implementations, the reference azimuth may be determined by calculating an elevation angle between the user terminal and the second satellite based, at least in part, on the determined position of the user terminal (904A), raising the directional antenna to the calculated elevation angle (904B), advancing an orientation of the directional antenna in azimuth until one or more signals are received from the second satellite (904C), verifying the second satellite's identity based, at least in part, on the one or more received signals (904D), and deriving the reference azimuth based, at least in part, on the orientation of the directional antenna and a known position of the second satellite (904E). The elevation angle may be calculated, for example, by executing the satellite position determination SW module 732D of FIG. 7. The directional antenna may be raised to the calculated elevation angle, for example, by executing the antenna alignment SW module 732G of FIG. 7. The second satellite's identity may be verified, for example, by executing the reference satellite detection and verification SW module 732C of FIG. 7. The reference azimuth may be derived, for example, by executing the reference azimuth SW module 732E of FIG. 7.

Next, ephemeris data for the first satellite is obtained by the UT 700 (906). For at least some implementations, the ephemeris data for the first satellite may be received in a beacon transmitted from the second satellite (906A). The beacon may be received and decoded, for example, by executing the beacon decoding SW module 732F of FIG. 7.

Finally, a directional antenna of the UT 700 is aligned with the first satellite based, at least in part, on the position of the UT 700, the reference azimuth of the UT 700, and the received ephemeris data (908). The directional antenna 710 may be aligned with the first satellite, for example, by executing the antenna alignment SW module 732G of FIG. 7.

FIG. 9B is an illustrative flow chart depicting an example operation 910 for verifying the second satellite's identity. To verify the second satellite's identity, the UT 700 may de-modulate the one or more received signals to extract an identifier of the second satellite (912), and may then compare the extracted identifier with a predetermined identifier of the second satellite (914). For some implementations, the verification operation 910 may be performed, for example, by executing the reference satellite detection and verification SW module 732C of FIG. 7.

FIG. 9C is an illustrative flow chart depicting another example operation 920 for verifying the second satellite's identity. To verify the second satellite's identity, the UT 700 may determine a configuration of active transponders of the second satellite (922), and may then compare the determined configuration of active transponders with a predetermined active transponder configuration (924). For some implementations, the verification operation 920 may be performed, for example, by executing the reference satellite detection and verification SW module 732C of FIG. 7.

For some implementations, the directional antenna 710 associated with UT 700 may have a maximum elevation angle of approximately 45 degrees, which may correspond to a location on Earth near the $39^{th}$ degree of latitude. For such implementations, a UT 700 that is positioned north of the $39^{th}$ degree of latitude may not be able to receive signals from GSO satellites such as GSO satellites 621A-621D. Thus, for a UT 700 that is not able to receive signals from GSO satellites, the UT 700 may receive ephemeris data for the first satellites (e.g., NGSO satellites 300A-300H) from beacons transmitted from one or more HEO satellites that remain visible at northern latitudes (e.g., latitudes greater than approximately 39 degrees) for relatively long periods of time. The orbits of HEO satellites may be characterized as having an apogee relatively far from Earth (e.g., at a distance of approximately 35,000 km) and having a perigee relatively close to Earth (e.g., at a distance of approximately 300 km), and HEO satellites typically have long dwell times at the apogee. For one example, FIG. 10A is a diagram 1000 depicting the well-known Molniya orbital pattern 1002, which may provide satellite coverage for high latitudes in North America (as shown in FIG. 10A) and central Asia (not shown for simplicity).

Figure 10B:
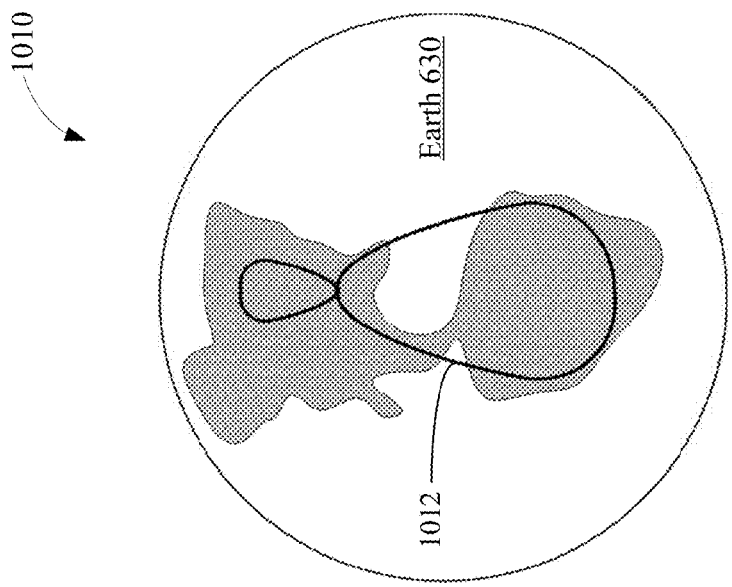
FIG. 10B shows a diagram depicting a satellite in a second highly elliptical orbit (HEO) around Earth.
Figure 10A:
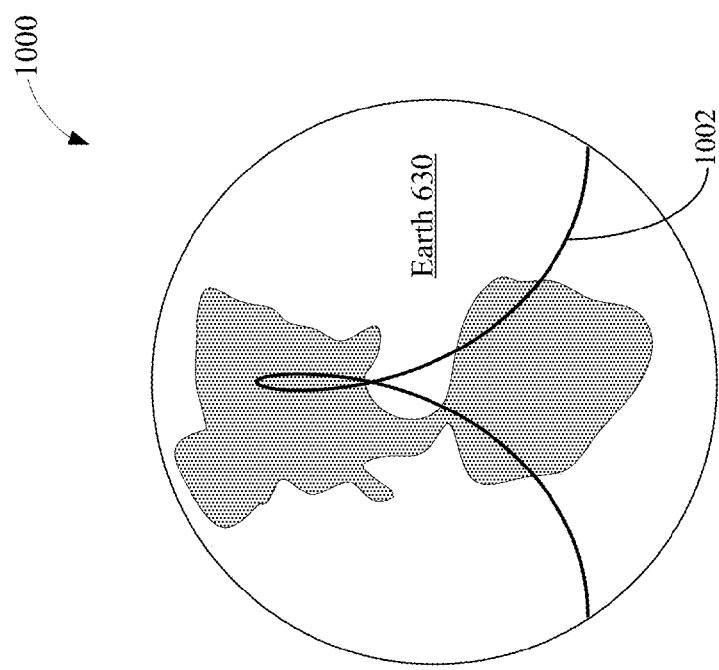
FIG. 10A shows a diagram depicting a satellite in a first highly elliptical orbit (HEO) around Earth.

For another example, FIG. 10B is a diagram 1010 depicting the well-known Tundra orbital pattern 1012, which may provide satellite coverage for high latitudes in North America (as shown in FIG. 10B). More specifically, for at least one implementation, a constellation of HEO satellites having Tundra orbital patterns 1012 that provides a satellite-based broadcast radio service may be used to transmit beacons containing ephemeris data for a number of the first satellites associated with the first satellite service (e.g., NGSO satellites 300A-300H). The HEO satellites may transmit broadcast radio signals and beacons of the example implementations on a Satellite Digital Audio Radio Service (SDARS) frequency band, which may have a center frequency of approximately 2.3 GHz.

For at least some example implementations, the directional antenna 710 associated with the UT 700 may communicate with the NSGO satellites 300A-300H using portions of the Ku frequency band (e.g., between approximately 10.7 GHz and 12.7 GHz), and therefore may not be able to receive signals transmitted in the SDARS frequency band. For such implementations, the UT 700 may also include or be associated with one or more well-known patch antennas configured to receive satellite signals in the SDARS frequency band.

Figure 11:
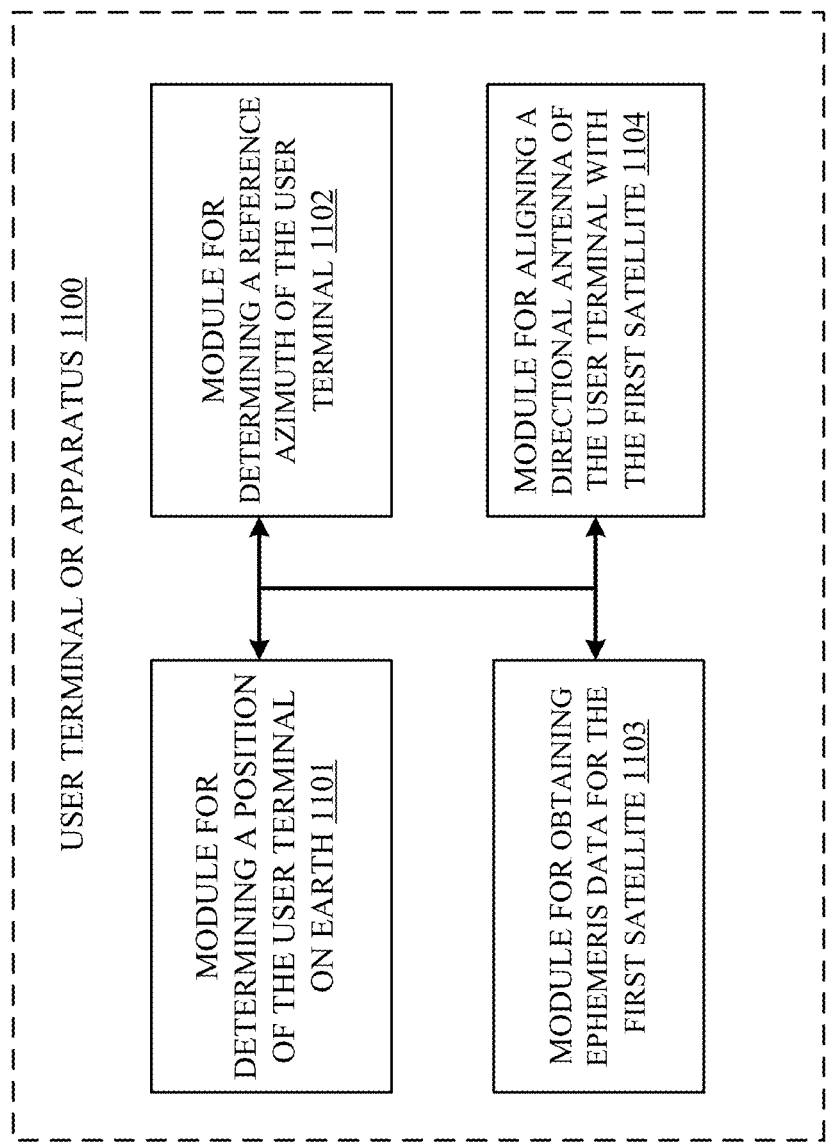
FIG. 11 is another block diagram of several sample aspects of apparatuses configured to establish a communication link with a satellite as taught herein.

FIG. 11 shows an example user terminal or apparatus 1100 represented as a series of interrelated functional modules. A module 1101 for determining a position of the user terminal on Earth may correspond at least in some aspects to, for example, a processor as discussed herein (e.g., processor 720). A module 1102 for determining a reference azimuth of the user terminal may correspond at least in some aspects to, for example, a processor as discussed herein (e.g., processor 720). A module 1103 for obtaining ephemeris data for the first satellite may correspond at least in some aspects to, for example, a processor as discussed herein (e.g., processor 720). A module 1104 for aligning a directional antenna of the user terminal with the first satellite may correspond at least in some aspects to, for example, a processor as discussed herein (e.g., processor 720).

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for establishing a communication link between a user terminal and a first satellite associated with a first satellite service, the method comprising:
   determining a position of the user terminal on Earth based, at least in part, on location information provided by a satellite positioning system (SPS) receiver associated with the user terminal;
   determining a reference azimuth of the user terminal based, at least in part, on a position of a second satellite associated with a second satellite service that is different than the first satellite service;
   obtaining ephemeris data for the first satellite; and
   aligning a directional antenna of the user terminal with the first satellite based, at least in part, on the position of the user terminal, the reference azimuth of the user terminal, and the obtained ephemeris data.

2. The method of claim 1, wherein the obtaining comprises:
   receiving, from the second satellite, a beacon including the ephemeris data for the first satellite.

3. The method of claim 2, wherein the beacon comprises a sub-carrier signal transmitted from the second satellite.

4. The method of claim 2, wherein the ephemeris data is encoded onto the beacon using a first modulation scheme that is different than a second modulation scheme associated with the second satellite service.

5. The method of claim 1, wherein the first satellite is in a non-geosynchronous orbit (NGSO) around Earth, and the second satellite is in a geosynchronous orbit (GSO) around Earth.

6. The method of claim 5, wherein determining the reference azimuth comprises:
calculating an elevation angle between the user terminal and the second satellite based, at least in part, on the determined position of the user terminal;
raising the directional antenna to the calculated elevation angle;
advancing an orientation of the directional antenna in azimuth until one or more signals are received from the second satellite;
verifying the second satellite's identity based, at least in part, on the one or more received signals; and
deriving the reference azimuth based, at least in part, on the orientation of the directional antenna and a known position of the second satellite.

7. The method of claim 6, wherein the orientation of the directional antenna is based, at least in part, on a signal strength of at least one of the received signals.

8. The method of claim 6, wherein verifying the second satellite's identity comprises:
de-modulating the one or more received signals to extract an identifier of the second satellite; and
comparing the extracted identifier with a predetermined identifier of the second satellite.

9. The method of claim 6, wherein verifying the second satellite's identity comprises:
determining a configuration of active transponders of the second satellite; and
comparing the determined configuration of active transponders with a predetermined active transponder configuration of the second satellite.

10. The method of claim 1, wherein the first satellite is in a non-geosynchronous orbit (NGSO) around Earth, the second satellite is in a highly eccentric orbit (HEO) around Earth, and obtaining the ephemeris data for the first satellite comprises:
receiving, from the second satellite via a patch antenna coupled to the user terminal, a beacon including the ephemeris data for the first satellite.

11. The method of claim 10, wherein the beacon is received on a satellite digital audio radio service (SDARS) frequency band, and the communication link is associated with at least a portion of a Ku frequency band.

12. A user terminal for establishing a communication link with a first satellite associated with a first satellite service, the user terminal comprising:
one or more processors; and
a memory configured to store instructions that, when executed by the one or more processors, cause the user terminal to:
determine a position of the user terminal on Earth based, at least in part, on location information provided by a satellite positioning system (SPS) receiver associated with the user terminal;
determine a reference azimuth of the user terminal based, at least in part, on a position of a second satellite associated with a second satellite service that is different than the first satellite service;
obtain ephemeris data for the first satellite; and
align a directional antenna of the user terminal with the first satellite based, at least in part, on the position of the user terminal, the reference azimuth of the user terminal, and the obtained ephemeris data.

13. The user terminal of claim 12, wherein execution of the instructions to obtain the ephemeris data for the first satellite causes the user terminal to:
receive, from the second satellite, a beacon including the ephemeris data for the first satellite.

14. The user terminal of claim 12, wherein the first satellite is in a non-geosynchronous orbit (NGSO) around Earth, and the second satellite is in a geosynchronous orbit (GSO) around Earth.

15. The user terminal of claim 14, wherein execution of the instructions to determine the reference azimuth causes the user terminal to:
calculate an elevation angle between the user terminal and the second satellite based, at least in part, on the determined position of the user terminal;
raise the directional antenna to the calculated elevation angle;
advance an orientation of the directional antenna in azimuth until one or more signals are received from the second satellite;
verify the second satellite's identity based, at least in part, on the one or more received signals; and
derive the reference azimuth based, at least in part, on the orientation of the directional antenna and a known position of the second satellite.

16. The user terminal of claim 15, wherein execution of the instructions to verify the second satellite's identity causes the user terminal to:
de-modulate the one or more received signals to extract an identifier of the second satellite; and
compare the extracted identifier with a predetermined identifier of the second satellite.

17. The user terminal of claim 15, wherein execution of the instructions to verify the second satellite's identity causes the user terminal to:
determine a configuration of active transponders of the second satellite; and
compare the determined configuration of active transponders with a predetermined active transponder configuration of the second satellite.

18. The user terminal of claim 12, wherein the first satellite is in a non-geosynchronous orbit (NGSO) around Earth, the second satellite is in a highly eccentric orbit (HEO) around Earth, and execution of the instructions to obtain the ephemeris data for the first satellite causes the user terminal to:
receive, from the second satellite via a patch antenna coupled to the user terminal, a beacon including the ephemeris data for the first satellite.

19. A user terminal for establishing a communication link with a first satellite associated with a first satellite service, the user terminal comprising:
means for determining a position of the user terminal on Earth based, at least in part, on location information provided by a satellite positioning system (SPS) receiver associated with the user terminal;
means for determining a reference azimuth of the user terminal based, at least in part, on a position of a second satellite associated with a second satellite service that is different than the first satellite service;
means for obtaining ephemeris data for the first satellite; and
means for aligning a directional antenna of the user terminal with the first satellite based, at least in part, on the position of the user terminal, the reference azimuth of the user terminal, and the obtained ephemeris data.

20. The user terminal of claim 19, wherein the means for obtaining the ephemeris data for the first satellite is to:
receive, from the second satellite, a beacon including the ephemeris data for the first satellite.

21. The user terminal of claim 19, wherein the first satellite is in a non-geosynchronous orbit (NGSO) around Earth, the second satellite is in a geosynchronous orbit (GSO) around Earth, and the means for determining the reference azimuth is to:
calculate an elevation angle between the user terminal and the second satellite based, at least in part, on the position of the user terminal;
raise the directional antenna to the calculated elevation angle;
advance an orientation of the directional antenna in azimuth until one or more signals are received from the second satellite;
verify the second satellite's identity based, at least in part, on the one or more received signals; and
derive the reference azimuth based, at least in part, on the orientation of the directional antenna and a known position of the second satellite.

22. The user terminal of claim 21, wherein the second satellite's identity is verified by:
de-modulating the one or more received signals to extract an identifier of the second satellite; and
comparing the extracted identifier with a predetermined identifier of the second satellite.

23. The user terminal of claim 21, wherein the second satellite's identity is verified by:
determining a configuration of active transponders of the second satellite; and
comparing the determined configuration of active transponders with a predetermined active transponder configuration of the second satellite.

24. The user terminal of claim 19, wherein the first satellite is in a non-geosynchronous orbit (NGSO) around Earth, the second satellite is in a highly eccentric orbit (HEO) around Earth, and the means for obtaining the ephemeris data for the first satellite is to:
receive, from the second satellite via a patch antenna coupled to the user terminal, a beacon including the ephemeris data for the first satellite.

25. A non-transitory computer-readable medium storing instructions that, when executed by one or more processors of a user terminal, cause the user terminal to establish a communication link with a first satellite associated with a first satellite service by performing operations comprising:
determining a position of the user terminal on Earth based, at least in part, on location information provided by a satellite positioning system (SPS) receiver associated with the user terminal;
determining a reference azimuth of the user terminal based, at least in part, on a position of a second satellite associated with a second satellite service that is different than the first satellite service;
obtaining ephemeris data for the first satellite; and
aligning a directional antenna of the user terminal with the first satellite based, at least in part, on the position of the user terminal, the reference azimuth of the user terminal, and the obtained ephemeris data.

26. The non-transitory computer-readable medium of claim 25, wherein execution of the instructions for obtaining the ephemeris data for the first satellite causes the user terminal to perform operations further comprising:
receiving, from the second satellite, a beacon including the ephemeris data for the first satellite.

27. The non-transitory computer-readable medium of claim 25, wherein the first satellite is in a non-geosynchronous orbit (NGSO) around Earth, the second satellite is in a geosynchronous orbit (GSO) around Earth, and execution of the instructions for determining the reference azimuth causes the user terminal to perform operations further comprising:
calculating an elevation angle between the user terminal and the second satellite based, at least in part, on the position of the user terminal;
raising the directional antenna to the calculated elevation angle;
advancing an orientation of the directional antenna in azimuth until one or more signals are received from the second satellite;
verifying the second satellite's identity based, at least in part, on the one or more received signals; and
deriving the reference azimuth based, at least in part, on the orientation of the directional antenna and a known position of the second satellite.

28. The non-transitory computer-readable medium of claim 27, wherein execution of the instructions for verifying the second satellite's identity causes the user terminal to perform operations further comprising:
de-modulating the one or more received signals to extract an identifier of the second satellite; and
comparing the extracted identifier with a predetermined identifier of the second satellite.

29. The non-transitory computer-readable medium of claim 27, wherein execution of the instructions for verifying the second satellite's identity causes the user terminal to perform operations further comprising:
determining a configuration of active transponders of the second satellite; and
comparing the determined configuration of active transponders with a predetermined active transponder configuration of the second satellite.

30. The non-transitory computer-readable medium of claim 25, wherein the first satellite is in a non-geosynchronous orbit (NGSO) around Earth, the second satellite is in a highly eccentric orbit (HEO) around Earth, and execution of the instructions for obtaining the ephemeris data for the first satellite causes the user terminal to perform operations further comprising:
receiving, from the second satellite via a patch antenna coupled to the user terminal, a beacon including the ephemeris data for the first satellite.

* * * * *